United States Patent [19]

Ovshinsky et al.

[11] Patent Number: 5,523,182

[45] Date of Patent: Jun. 4, 1996

[54] ENHANCED NICKEL HYDROXIDE POSITIVE ELECTRODE MATERIALS FOR ALKALINE RECHARGEABLE ELECTROCHEMICAL CELLS

[75] Inventors: Stanford R. Ovshinsky, Bloomfield Hills; Michael A. Fetcenko, Rochester Hills; Cristian Fierro, Troy; Paul R. Gifford, Troy; Dennis A. Corrigan, Troy; Peter Benson, Rochester; Franklin J. Martin, Rochester Hills, all of Mich.

[73] Assignee: Ovonic Battery Company, Inc., Troy, Mich.

[21] Appl. No.: 333,457

[22] Filed: Nov. 2, 1994

Related U.S. Application Data

[63] Continuation-in-part of Ser. No. 300,610, Sep. 2, 1994, and a continuation-in-part of Ser. No. 308,764, Sep. 19, 1994, each is a continuation-in-part of Ser. No.27,973, Mar. 8, 1993, Pat. No. 5,348,822, which is a continuation-in-part of Ser. No. 975,031, Nov. 12, 1992, Pat. No. 5,344,728.

[51] Int. Cl.[6] ............................ H01M 4/32; H01M 4/52
[52] U.S. Cl. ..................... 429/223; 429/218; 429/224
[58] Field of Search ............................... 429/218, 223, 429/224

[56] References Cited

U.S. PATENT DOCUMENTS

| 4,574,096 | 3/1986 | Ferrando | 427/126.6 |
|---|---|---|---|
| 4,595,463 | 6/1986 | Lee | 204/2.1 |
| 4,837,119 | 6/1989 | Ikoma et al. | 429/223 |
| 4,844,948 | 7/1989 | Nakahori et al. | 429/223 |
| 4,985,318 | 1/1991 | Oshitani et al. | 429/223 |
| 5,100,748 | 3/1992 | Doniat et al. | 429/223 |

OTHER PUBLICATIONS

F. A. Cotton and G. Wilkinson, *Advanced Inorganic Chemistry*, 3rd edition, Interscience Publishers, 1972, pp. 189, 208, 802.

*Primary Examiner*—Prince Willis, Jr.
*Assistant Examiner*—Carol Chaney
*Attorney, Agent, or Firm*—Marc J. Luddy; Marvin S. Siskind; David W. Schumaker

[57] ABSTRACT

A positive electrode material for use in electrochemical cells. This material comprises particles of positive electrode material including at least one electrochemically active hydroxide and a substantially continuous, uniform, encapsulant layer surrounding the particles of positive electrode material. The encapsulant layer is formed from a material which, upon oxidation during processing or during charging of the electrode, is convertible to a highly conductive form, and which, upon subsequent discharge of the electrode, does not revert to its previous form. Preferably, the electrochemically active hydroxide includes at least nickel hydroxide. The encapsulant layer is preferably formed from at least cobalt hydroxide or cobalt oxyhydroxide. This layer is formed on the particles of positive electrode material by precipitation from a cobalt salt solution, which can be a cobalt sulfate solution. Also disclosed are positive electrodes including the material and a precipitation method of forming the material.

14 Claims, 3 Drawing Sheets

ENHANCED NICKEL HYDROXIDE POSITIVE ELECTRODE MATERIALS FOR ALKALINE RECHARGEABLE ELECTROCHEMICAL CELLS

CONTINUING INFORMATION

This application is a continuation-in-part of U.S. patent application Ser. No. 08/300,610 (filed 2 Sep. 1994) and U.S. patent application Ser. No. 08/308,764 (filed 19 Sep. 1994) both of which are continuations in part of U.S. Pat. No. 5,348,822 (application Ser. No. 08/027,973, filed 8 Mar. 1993) which is a continuation in part of U.S. Pat. No. 5,344,728 (application Ser. No. 07/975,031, filed 12 Nov. 1992).

FIELD OF THE INVENTION

The present invention relates generally to an optimized nickel hydroxide positive electrode materials. More specifically, this invention relates to an enhanced nickel hydroxide positive electrode where particles of nickel hydroxide material are encapsulated with a conductive material. The encapsulant layer is formed from a material which, upon oxidation during processing or during charging of the electrode, is convertible to an electrically conductive form, and which, upon discharge of the electrode, does not revert to its previous form. Cobalt oxide and hydroxide of various oxidation states is the preferred material for encapsulation. Cells using the present invention have demonstrated a remarkable reduction in internal pressure rise during cycling. The instant invention also relates to a method for forming the modified nickel hydroxide powder materials.

BACKGROUND OF THE INVENTION

In rechargeable alkaline cells, weight and portability are important considerations. It is also advantageous for rechargeable alkaline cells to have long operating lives without the necessity of periodic maintenance. Rechargeable alkaline cells are used in numerous consumer devices such as calculators, portable radios, and cellular phones. They are often configured into a sealed power pack that is designed as an integral part of a specific device. Rechargeable alkaline cells can also be configured as larger cells that can be used, for example, in industrial, aerospace, and electric vehicle applications.

The best rechargeable alkaline cells are ones that can operate as an "install and forget" power source. With the exception of periodic charging, a rechargeable alkaline cell should perform without attention and should not become a limiting factor in the life of the device it powers.

Stanford R. Ovshinsky, by applying his fundamental principles of disorder, pioneered the development of the first commercial nickel metal hydride (NiMH) battery. For more than three decades, virtually every other manufacturer in the world studied the NiMH battery technology, but no commercial battery of this kind existed until after the publication of U.S. Pat. No. 4,623,597 to Ovshinsky and Ovshinsky's related technical papers which disclosed basic and fundamentally new principles of battery material design. NiMH batteries are the only truly "green" battery because they can be completely recycled. NiMH batteries are the only rechargeable battery that can meet society's requirements for an ecological, renewable source of electrochemical energy.

Ni—MH cells utilize a negative electrode that is capable of the reversible electrochemical storage of hydrogen. Ni—MH cells usually employ a positive electrode of nickel hydroxide material. The negative and positive electrodes are spaced apart in the alkaline electrolyte. Upon application of an electrical potential across a Ni-MH cell, the Ni-MH material of the negative electrode is charged by the electrochemical absorption of hydrogen and the electrochemical discharge of a hydroxyl ion, as shown in equation (1):

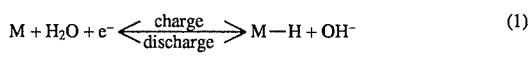
$$M + H_2O + e^- \underset{\text{discharge}}{\overset{\text{charge}}{\rightleftharpoons}} M-H + OH^- \qquad (1)$$

The negative electrode reactions are reversible. Upon discharge, the stored hydrogen is released to form a water molecule and release an electron. The reactions that take place at the nickel hydroxide positive electrode of a Ni—MH cell are shown in equation (2):

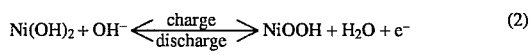
$$Ni(OH)_2 + OH^- \underset{\text{discharge}}{\overset{\text{charge}}{\rightleftharpoons}} NiOOH + H_2O + e^- \qquad (2)$$

Ni—MH materials are discussed in detail in U.S. Pat. No. 5,277,999 to Ovshinsky, et al., the contents of which are incorporated by reference.

As previously mentioned, Stanford R. Ovshinsky was responsible for inventing new and fundamentally different electrochemical electrode materials. As predicted by Ovshinsky, detailed investigation by Ovshinsky's team determined that reliance on simple, relatively pure compounds was a major shortcoming of the prior art. Relatively pure crystalline compounds were found to have a low density of hydrogen storage sites, and the type of sites available occurred accidently and were not designed into the bulk of the material. Thus, the efficiency of the storage of hydrogen and the subsequent release of hydrogen to form water was determined to be poor. By applying his fundamental principles of disorder to electrochemical hydrogen storage, Ovshinsky drastically departed from conventional scientific thinking and created a disordered material having an ordered local environment where the entire bulk of the material was provided with catalytically active hydrogen storage sites.

Short-range, or local, order is elaborated on in U.S. Pat. No. 4,520,039 to Ovshinsky, entitled *Compositionally Varied Materials and Method for Synthesizing the Materials*, the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment and/or orbital overlap plays a significant role physically, electronically, or chemically so as to affect physical properties and hence the functions of the materials. Ovshinsky's use of disordered materials has fundamental scientific advantages. The elements of these materials offer a variety of bonding possibilities due to the multidirectionality of d-orbitals. The multidirectionality ("porcupine effect") of d-orbitals provides for a tremendous increase in density and hence active storage sites. These techniques result in means of synthesizing new materials which are disordered in several different senses simultaneously.

Ovshinsky had previously found that the number of surface sites could be significantly increased by making an amorphous film that resembled the surface of the desired relatively pure materials. As Ovshinsky explained in *Principles and Applications of Amorphicity, Structural Change, and Optical Information Encoding*, 42 *Journal De Physique* at C4-1096 (October 1981):

> Amorphicity is a generic term referring to lack of X-ray diffraction evidence of long-range periodicity and is not a sufficient description of a material. To understand amorphous materials, there are several important factors to be considered: the type of chemical bonding, the number of bonds generated by the local order, that is its coordination, and the influence of the entire local environment, both chemical and geometrical, upon the resulting varied configurations. Amorphicity is not determined by random packing of atoms viewed as hard spheres nor is the amorphous solid merely a host with atoms imbedded at random. Amorphous materials should be viewed as being composed of an interactive matrix whose electronic configurations are generated by free energy forces and they can be specifically defined by the chemical nature and coordination of the constituent atoms. Utilizing multi-orbital elements and various preparation techniques, one can outwit the normal relaxations that reflect equilibrium conditions and, due to the three-dimensional freedom of the amorphous state, make entirely new types of amorphous materials—chemically modified materials.

Once amorphicity was understood as a means of introducing surface sites in a film, it was possible to produce "disorder" that takes into account the entire spectrum of local order effects such as porosity, topology, crystallites, characteristics of sites, and distances between sites. Thus, rather than searching for material modifications that would yield ordered materials having a maximum number of accidently occurring surface irregularities, Ovshinky's team at ECD began constructing "disordered" materials where the desired irregularities were tailor made. See, U.S. Pat. No. 4,623,597, the disclosure of which is incorporated by reference.

The term "disordered," as used herein corresponds to the meaning of the term as used in the literature, such as the following:

> A disordered semiconductor can exist in several structural states, This structural factor constitutes a new variable with which the physical properties of the [material] . . . can be controlled. Furthermore, structural disorder opens up the possibility to prepare in a roetastable state new compositions and mixtures that far exceed the limits of thermodynamic equilibrium. Hence, we note the following as a further distinguishing feature. In many disordered [materials] . . . it is possible to control the short-range order parameter and thereby achieve drastic changes in the physical properties of these materials, including forcing new coordination numbers for elements . . . .

S. R. Ovshinsky, *The Shape of Disorder*, 32 *Journal of Non-Crystafiine Solids* at 22 (1979) (emphasis added).

The "short-range order" of these disordered materials are further explained by Ovshinsky in *The Chemical Basis of Amorphicity: Structure and Function*, 26:8–9 *Rev. Roum. Phys.* at 893–903 (1981):

> [S] hort-range order is not conserved . . . . Indeed, when crystalline symmetry is destroyed, it becomes impossible to retain the same short-range order. The reason for this is that the short-range order is controlled by the force fields of the electron orbitals therefore the environment must be fundamentally different in corresponding crystalline and amorphous solids. In other words, it is the interaction of the local chemical bonds with their surrounding environment which determines the electrical, chemical, and physical properties of the material, and these can never be the same in amorphous materials as they are in crystalline materials . . . . The orbital relationships that can exist in three-dimensional space in amorphous but not crystalline materials are the basis for new geometries, many of which are inherently anti-crystalline in nature. Distortion of bonds and displacement of atoms can be an adequate reason to cause amorphicity in single component materials. But to sufficiently understand the amorphicity, one must understand the three-dimensional relationships inherent in the amorphous state, for it is they which generate internal topology incompatible with the translational symmetry of the crystalline lattice . . . . What is important in the amorphous state is the fact that one can make an infinity of materials that do not have any crystalline counterparts, and that even the ones that do are similar primarily in chemical composition. The spatial and energetic relationships of these atoms can be entirely different in the amorphous and crystalline forms, even though their chemical elements can be the same . . .

Short-range, or local, order is elaborated on in U.S. Pat. No. 4,520,039 to Ovshinsky, entitled *Compositionally Varied Materials and Method for Synthesizing the Materials*, the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment plays a significant role physically, electrically, or chemically so as to affect the physical properties and hence the functions of the materials. These techniques result in means of synthesizing new materials which are disordered in several different senses simultaneously.

By forming metal hydride alloys from such disordered materials, Ovshinsky and his team were able to greatly increase the reversible hydrogen storage characteristics required for efficient and economical battery applications, and produce, for the first time, commercially viable batteries having high density energy storage, efficient reversibility, high electrical efficiency, bulk hydrogen storage without structural change or poisoning, long cycle life, and deep discharge capability.

The improved characteristics of these alloys result from tailoring the local chemical order and hence the local structural order by the incorporation of selected modifier elements into a host matrix. Disordered metal hydride alloys have a substantially increased density of catalytically active sites and storage sites compared to conventional ordered materials. These additional sites are responsible for improved efficiency of electrochemical charging/discharging and an increase in electrical energy storage capacity. The nature and number of storage sites can even be designed independently of the catalytically active sites. More specifically, these disordered multi-component alloys are thermodynamically tailored to allow storage of hydrogen atoms at a wide range of modulated bonding strengths within the range of reversibility suitable for use in secondary battery applications.

Based on these principles of disordered materials, described above, a family of extremely efficient electrochemical hydrogen storage materials were formulated. These are the Ti—V—Zr—Ni type active materials such as disclosed by Ovshinsky's team in U.S. Patent No. 4,551,400 ("the '400 Patent"), the disclosure of which is incorporated by reference. These materials reversibly form hydrides in order to store hydrogen. All the materials used in the '400 Patent utilize a Ti—V—Ni composition, where at least Ti, V, and Ni are present with at least one or more of Cr, Zr, and Al. The materials of the '400 Patent are generally multiphase polycrystalline materials, which may contain, but are not limited to, one or more phases of Ti—V—Zr—Ni material with $C_{14}$ and $C_{15}$ type crystal structures. Other Ti—V—Zr—Ni alloys may also be used for fabricating rechargeable hydrogen storage negative electrodes. One such family of materials are those described in U.S. Pat. No. 4,728,586 ("the '586 Patent"), titled *Enhanced Charge Retention Electrochemical Hydrogen Storage Afioys and an Enhanced Charge Retention Electrochemical Cell*, the disclosure of which is incorporated by reference.

The characteristic surface roughness of the metal electrolyte interface is a result of the disordered nature of the material. Since all of the constituent elements, as well as many alloys and phases of them, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys, in an alkaline environment. The microscopic chemical, physical, and crystallographic parameters of the individual phases within the hydrogen storage alloy material are believed to be important in determining its macroscopic electrochemical characteristics.

In addition to the physical nature of its roughened surface, it has been observed that V—Ti—Zr—Ni alloys tend to reach a steady state surface condition and particle size. This steady state surface condition is characterized by a relatively high concentration of metallic nickel. These observations are consistent with a relatively high rate of removal through precipitation of the oxides of titanium and zirconium from the surface and a much lower rate of nickel solubilization. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface of the negative electrode, which has a conductive and catalytic component—the metallic nickel—appears to interact with chromium alloys in catalyzing various hydride and dehydride reaction steps. To a large extent, many electrode processes, including competing electrode processes, are controlled by the presence of chromium in the hydrogen storage alloy material, as disclosed in the '586 Patent.

Rechargeable alkaline cells can be either vented cells or sealed cells. During normal operation, a vented cell typically permits venting of gas to relieve excess pressure as part of the normal operating behavior. In contrast, a sealed cell generally does not permit venting on a regular basis. As a result of this difference, the vent assemblies and the amounts of electrolyte in the cell container relative to the electrode geometry both differ significantly.

Vented cells operate in a "flooded condition." The term "flooded condition" means that the electrodes are completely immersed in, covered by, and wetted by the electrolyte. Thus, such cells are sometimes referred to as "flooded cells." A vented cell is typically designed for very low operating pressures of only a few pounds per square inch after which excess pressures are relieved by a vent mechanism.

In contrast, sealed cells are designed to operate in a "starved" electrolyte configuration, that is with only the minimum amount of electrolyte necessary to permit gas recombination. The enclosure for a sealed cell is normally metallic and the cell may be designed for operation at up to about 100 p.s.i. absolute or higher. Because they are sealed, such cells do not require periodic maintenance.

Typically, a sealed rechargeable alkaline cell for use in consumer appliances, such as a C cell, uses a cylindrical nickel-plated steel case as the negative terminal and the cell cover as the positive terminal. An insulator separates the positive cover from the negative cell can. The electrodes are wound to form a compact "jelly roll" with the electrodes of opposite polarity isolated from each other by a porous, woven or non-woven separator of nylon or polypropylene, for example. A tab extends from each electrode to create a single current path through which current is distributed to the entire electrode area during charging and discharging. The tab on each electrode is electrically connected to its respective terminal.

In sealed cells, the discharge capacity of a nickel based positive electrode is limited by the amount of electrolyte, the amount of active material, and the charging efficiencies. The charge capacities of a Cd negative electrode and a MH negative electrode are both provided in excess, to maintain the optimum capacity and provide overcharge protection.

An additional goal in making any type of electrode is to obtain as high an energy density as possible. For small batteries, the volume of a nickel hydroxide positive electrode is sometimes more important than weight, and the volumetric capacity is usually measured in mAh/cc, or an equivalent units and specific capacity is written as mAh/g.

At present, sintered, foamed, or pasted nickel hydroxide positive electrodes are used in NiCd and Ni—MH cells. The process of making sintered electrodes is well known in the art. Conventional sintered electrodes normally have an energy density of around 480–500 mAh/cc. In order to achieve significantly higher loading, the current trend has been away from sintered positive electrodes and toward foamed and pasted electrodes.

In general, sintered positive electrodes are constructed by applying a nickel powder slurry to a nickel-plated steel base followed by sintering at high temperature. This process causes the individual particles of nickel to weld at their points of contact resulting in a porous material that is approximately 80% open volume and 20% solid metal. This sintered material is then impregnated with active material by soaking it in an acidic solution of nickel nitrate, followed by conversion to nickel hydroxide by reaction with an alkali metal hydroxide. After impregnation, the material is subjected to electrochemical formation.

In practice, electrode capacity beyond the one-electron transfer theoretical capacity is not usually observed. One reason for this is incomplete utilization of the active material due to electronic isolation of oxidized material. Because reduced nickel hydroxide material has a high electronic resistance, the reduction to nickel hydroxide adjacent the current collector forms a less conductive surface that interferes with the subsequent reduction of oxidized active that is farther away. Ovshinsky and his team have developed positive electrode materials that have demonstrated reliable transfer of more than one electron per nickel atom. Such materials are described in U.S. Pat. No. 5,344,728 and 5,348,822 (which describe stabilized disordered positive electrode materials) and copending U.S. patent application Ser. No. 08/300,610 filed Aug. 23, 1994, and U.S. patent application Ser. No. 08/308,764 filed Sep. 19, 1994.

It is known in the art that cobalt metal, cobalt hydroxide, and cobalt oxide can be added to nickel hydroxide at a level of typically 0–5% in commercial applications. This level of cobalt additive is used to improve capacity and rate capability, provide precharge to the negative electrode by dissolving and redistributing as an electrically conductive network within the nickel hydroxide active material.

It has been postulated that when Co and CoO additives are mixed with nickel hydroxide powder to form a paste for the production of pasted electrodes that Co and CoO form an interconnected network of cobalt hydroxide ($Co(OH)_2$,CoOOH) that increases electronic conductivity. This in turn would result in higher electrode capacities and utilizations.

This conductivity increase is thought to occur for the reasons described in U.S. Pat. No. 4,844,999 to Oshitani, et al. and U.S. Pat. No. 4,985,318 also to Oshitani, et al. both of which are hereby incorporated by reference. Both of these patents describe mixing cobalt compound powders with nickel hydroxide active material to form a paste. It is thought that improvements resulting from the addition of cobalt compounds occurs because cobalt increases the conductivity between the nickel hydroxide particles themselves.

In that respect, Oshitani, et al., in U.S. Pat. No. 4,844,999 (the '999 patent) teach that:

"When a cobalt compound additive is dissolved outside the crystals of nickel hydroxide to establish connection between the current collector and the nickel hydroxide particles by virtue of the reaction,

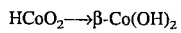

before the battery is charged, the cobalt compound is converted into cobalt oxyhydroxide of high conductivity by virtue of the reaction,

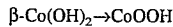

to smoothen [sic] the flow of electrons between the nickel fibers of the current collector and the nickel hydroxide particles and increase the ratio of utilization of the active material. The mechanism of the reactions mentioned above is depicted in the model in FIG. 1."

(Reproduced as FIG. 1 of the present application.)

The '999 patent also states:

"For the active material to react, smooth passage of electrons from the current collector to the surface of the particles of active material is an essential requirement. To the smooth [sic] passage of electrons, the presence of an electroconductive network of CoOOH particles in a free state (existing in the surface of the CoOOH [sic] particles without forming a solid solution with nickel hydroxide) is indispensable.

As regards the CoO additive which is destined to form the network, FIG. 7 (reproduced as FIG. 2 in the present application) shows the relation between the amount of CoO added, the ratio of utilization of active material, and the energy density per unit volume of the electrode sheet. As the amount of the CoO added is increased, so the ratio of utilization of active material is heightened to be converged in the vicinity of 100%. Since the additive itself merely contributes to the electroconductivity and takes no part actually in discharge, the actual energy density of the electrode sheet tends to decline from the vicinity of 15%."

Finally, the '999 patent states:

"The pasted electrode loaded with the powder in which nickel hydroxide is dipped in $HCoO_2$ ions to form a cobalt hydroxide layer on the surface was inferior to the electrode formed by mixing CoO powders in respect of the ratio of utilization of active material and was as much as the electrode formed by mixing $\beta$-Co(OH)$_2$ powders in the ratio of utilization of active material. As for the pasted electrode loaded with the powder in which a conductive CoOOH layer is formed on the surface of nickel oxyhydroxide (the powder of which obtained [sic] by removing nickel fiber which is a current collector from the electrode formed by mixing CoO powders after charging and discharging the electrode), the ratio of utilization of active material was inferior. This teaches that it is indispensably required to form a conductive network (CoOOH) of active material and current collector in the produced electrode and that the formation of the conductive network in advance on the surface of the active material provides an insufficient effect."

Thus, the '999 patent describes how Oshitani, et al., were not able to produce electrodes that were simultaneously capable of a high active material utilization and a high energy density (which relate directly to electrode capacity). In addition, the '999 patent fails to teach or suggest the role of the CoOOH network in inhibiting oxygen evolution and in protecting against potential poisons that can promote premature oxygen evolution. In fact, the '999 patent describes how prior art electrodes were known to routinely develop "dead spots," or areas of nickel hydroxide active material lacking cobalt coating that were prone to poisoning.

Unfortunately, the addition of compounds as described in the '999 patent, decreases the Ni(OH)$_2$ content from 90 wt % in the nickel hydroxide powder to approximately 80 wt % in the pasted material. This results in adverse effects on electrode capacity since cobalt compounds are not electrochemically active.

Thus, there is a need in the art for an active material powder/electrode system which can deliver both very high active material utilization and high electrode capacity.

SUMMARY OF THE INVENTION

The main objectives of the present invention is to provide a more uniform distribution of the cobalt network, inhibit gas evolution, and provide resistance to corrosion products for internal pressure reduction and stability.

Another objective of the present invention is to provide an electrode material that contains a decreased amount of CoO and Co(OH)$_2$ in the electrode preparation that simultaneously delivers the same, or increased utilization without a decrease in specific capacity.

Another objective of the present invention is to attain the characteristics described above at a decreased fabrication cost compared to the prior art.

These and other objectives are achieved by the positive electrode material of the present invention. This material comprises positive electrode particles including at least one electrochemically active hydroxide surrounded by a substantially continuous, uniform, encapsulant layer. This encapsulant layer is formed from a material that upon oxidation during processing or during charging becomes conductive, and does not revert to its precharge form upon subsequent discharge. Preferably, the electrochemically active hydroxide includes at least nickel hydroxide, and most preferably a Ni/Co/Zn triprecipitate.

The encapsulant layer is preferably formed from at least cobalt hydroxide, cobalt oxyhydroxide, manganese hydroxide, or a manganese oxide. This encapsulant layer is formed on the positive electrode particles by precipitation from a salt solution. An example of a cobalt salt solution is a cobalt sulfate solution. A particularly useful and stable form of encapsulant layer is attained by air oxidation of the cobalt hydroxide immediately following precipitation.

The nickel hydroxide used in the present invention can additionally includes at least one compositional modifier chosen from the group consisting of Al, Bi, Co, Cr, Cu, Fe, In, La, Mn, Ru, Sb, Sn, Ti, and Zn or one chemical modifier chosen from the group consisting of Al, Ba, Ca, Co, Cr, Cu, F, Fe, K, Li, Mg, Mn, Na, Sr, and Zn.

The present invention further provides for an electrochemical storage cell comprising: at least one positive electrode; at least one negative electrode; and electrolyte. The positive electrode includes the electrochemical storage material of the present invention.

Finally, the present invention includes a precipitation method for forming the encapsulant layer upon the particles of electrochemically active hydroxide material.

DETAILED DESCRIPTION OF THE INVENTION

Figure 1:
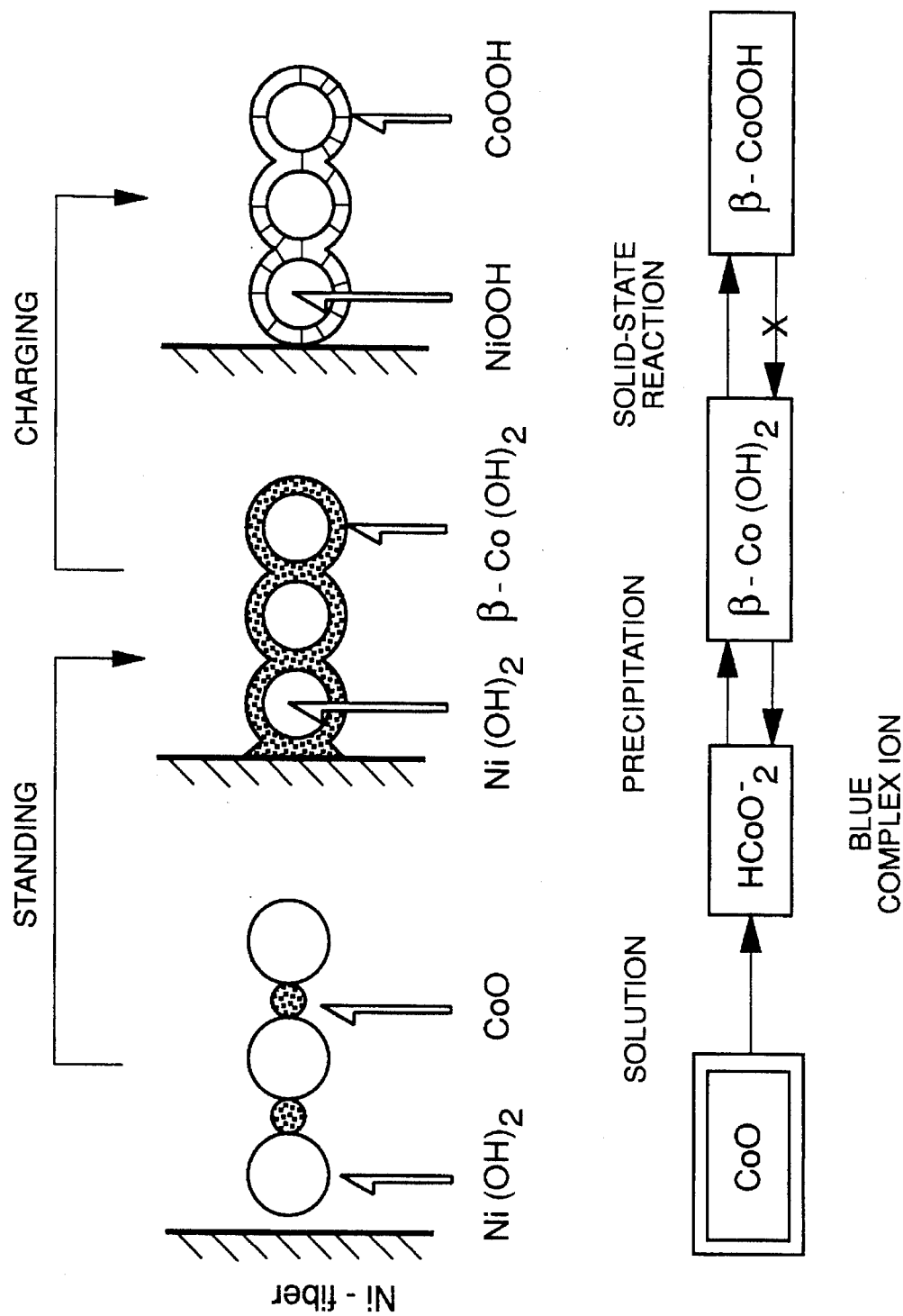
FIG. 1 depicts a simplistic one-dimensional view of the method of the prior art where cobalt is incorporated into nickel hydroxide positive electrodes to enhance their performance.

FIG. 1 shows a simplistic prior art view from U.S. Pat. 4,844,999 (discussed above), that illustrates how the addition of cobalt compounds, such as cobalt or cobalt oxide, result in the formation of a conductive network around nickel hydroxide active material particles in pasted electrodes. The cobalt compounds are dissolved in the electrolyte of the battery and are then redeposited onto the nickel hydroxide as cobalt hydroxide. During charging, the cobalt hydroxide is converted, in a non-reversible reaction, to cobalt oxyhydroxide. Cobalt oxyhydroxide is a highly conductive material which assists in cycling the active material by allowing electrons to flow more readily from the active material to the nickel fiber or foam substrate.

Figure 2:
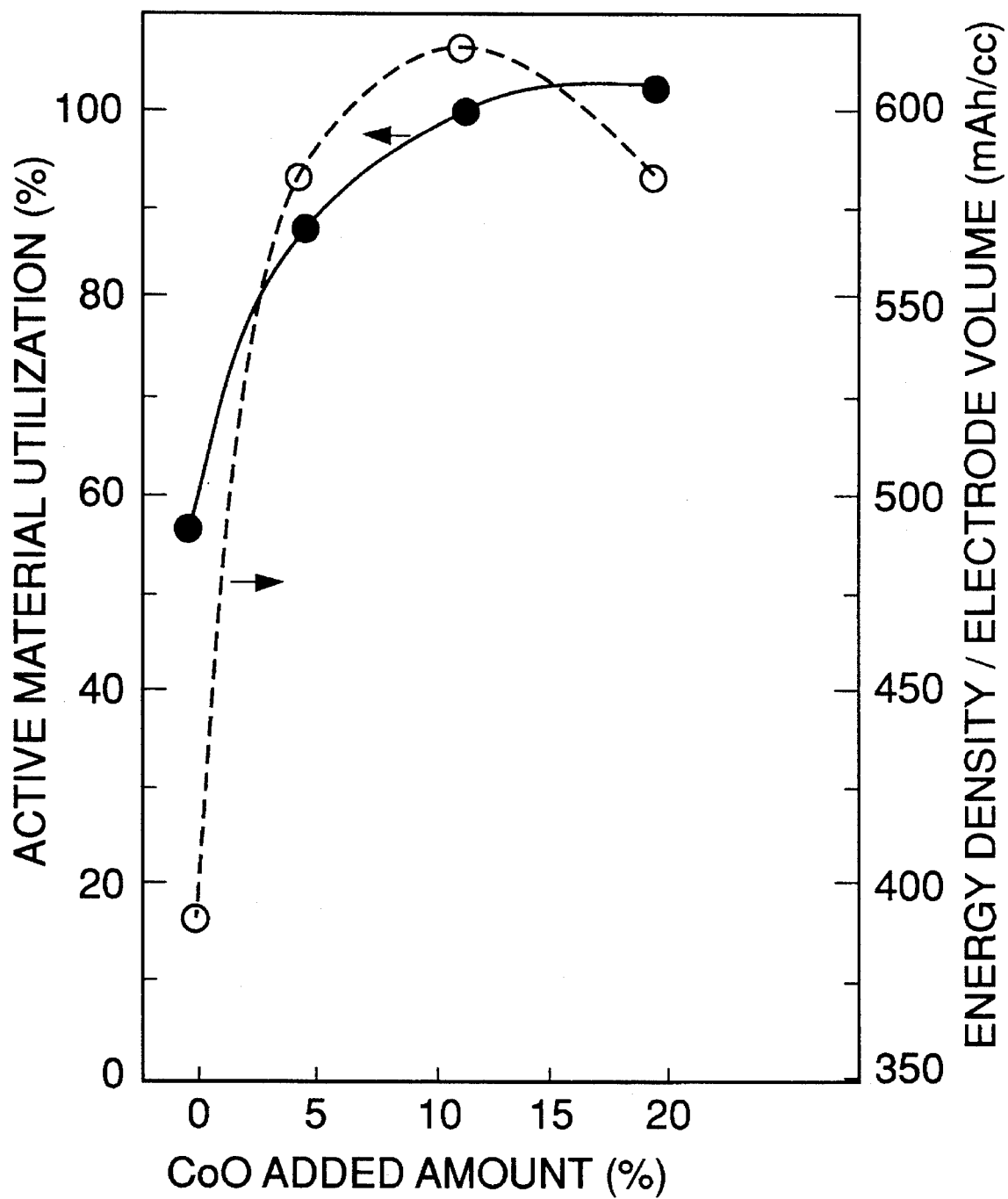
FIG. 2 is a graphical representation of data of the prior art data taken on positive electrodes that incorporate CoO. This figure specifically plots the percentage of CoO added to the electrode paste material on the ordinate versus both the percentage of active material utilization and energy density of the electrode (in mAh/cc) on the abscissa.

Unfortunately, the interconnected network described in the prior art is discontinuous. The prior art acknowledges that at least some areas of the active material do not participate in the charge/discharge cycling of the battery. This is most clearly seen in the prior art FIG. 2. This figure plots the percentage of CoO added to the electrode paste material on the ordinate versus both the percentage of active material utilization and energy density of the electrode (in mAh/cc) on the abscissa. FIG. 2 shows that to achieve higher energy densities, the amount of CoO added must be kept at a point which does not allow for optimal active material utilization. This is because as more and more CoO is added, the percentage of active nickel hydroxide in the electrode is reduced. Thus, as more CoO is added, while the percentage utilization of the active material is increased, the energy density of the electrode is decreased. There is also no guarantee that the cobalt network even with sufficient CoO additive remains uniform and sufficient after long term storage, cycling, or upon exposure to elevated temperatures.

Figure 3:
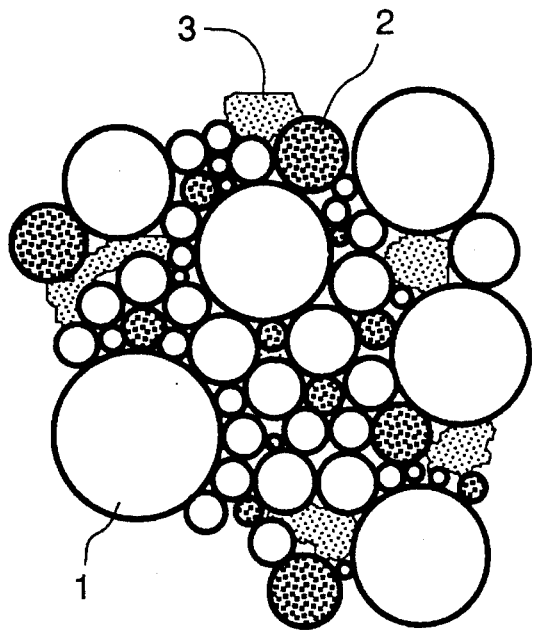
FIG. 3 is a schematic view of a cut-away portion of a three dimensional electrode which more realistically depicts the relationships between the components of the prior art and electrodes that contain CoO.

This dichotomy exists because an electrode is not as simplistic and one dimensional as is FIG. 1 depicts. FIG. 3 is a schematic view of a cut-away of a three dimensional electrode which more realistically depicts the relationships between the components of the electrode.

Specifically, FIG. 3 shows particles of nickel hydroxide active material 1 intermixed with particles of a cobalt compound 2, such as cobalt oxide. These particles are pasted on a substrate 3 of nickel fiber matte or nickel foam. This substrate 3 provides the electrical connection for the active material as well as structural support.

Figure 4:
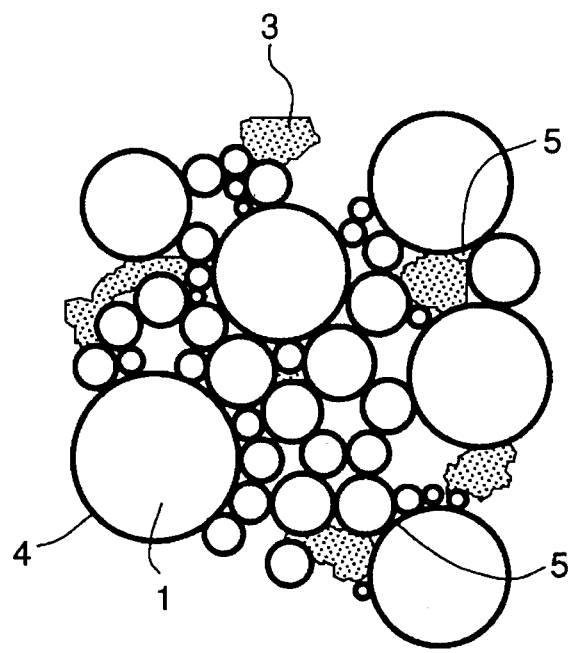
FIG. 4 depicts the prior art electrode of FIG. 3 after the CoO has dissolved in the electrolyte solution and has deposited cobalt hydroxide onto the electrode materials. Specifically shown are the non-coated, "dead" areas of the electrode.

It is well known that the cobalt compound dissolves into the electrolyte, is deposited as cobalt hydroxide onto the active material (and everywhere else), and is converted into cobalt oxyhydroxide in the electrode during charging. However, the resulting cobalt hydroxide coating is not as uniform and continuous as is depicted in FIG. 1. In reality, as shown in FIG. 4, while there are many areas 4 where cobalt hydroxide is deposited onto the nickel hydroxide active material particles 1, there are also just as many areas 5 where cobalt hydroxide is not deposited.

The areas 5, where there is no deposition, are critical. Without wishing to be bound by theory, it is believed that the areas 5 where there is no deposition are areas where the nickel hydroxide particles are too tightly packed to be accessible to dissolved cobalt; areas of intercontact between nickel hydroxide particles, and areas of contact between nickel hydroxide particles and the substrate. These areas are critical because without proper electrical connection, some portions of the nickel hydroxide active material will be left isolated from the electrical network of the electrode—and therefore under utilized. These areas are also susceptible to corrosion products from both the separator and metal hydride alloy. Additionally, a portion of the cobalt added to the electrode according to the prior art is wasted by deposition onto unnecessary portions of the electrode such as non-interconnected portions of the nickel fibers 3, as well as other parts of the batten such as can walls, electrode tabs, and separator.

These problems are overcome by the staged cobalt dips described in U.S. Pat. No. 5,394,728, (the '728 patent) of which the present application is a continuation in part. The contents of this patent, which describe a sintered nickel hydroxide positive electrode, are specifically incorporated by reference. As discussed in the '728 patent, the use of cobalt dips during the impregnation of the electrode results in enriched cobalt surface which provides better conductivity, poisoning resistance, and suppressed $O_2$ evolution.

These interconnect and waste problems are not overcome by in the prior art directed toward pasted electrode materials. This body of prior art teaches the addition of excess cobalt. As noted above, this leads to decreased energy density because as more cobalt (which does not contribute to the electrochemical capacity of the electrode) is added, the amount, and thus the percentage, of the nickel hydroxide active material in the electrode decreases.

Figure 5:
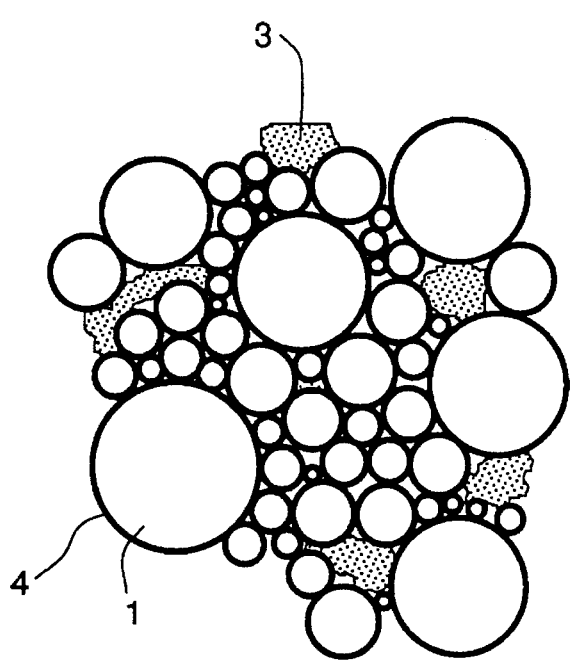
FIG. 5 depicts a similar electrode of the present invention, specifically pointing out the uniform, continuous coating of cobalt hydroxide which is pre-formed on the nickel hydroxide particles, thus eliminating "dead" spots.

The present invention describes a pasted positive electrode utilizing the principles of cobalt coating described in the '728 patent. The present application builds on these principles, and describes pasted positive electrode materials that overcome the deficiencies of the of the prior art pasted materials. FIG. 5 illustrates the significant difference that exists between the prior art of pasted materials and the present invention. In the present invention, instead of adding cobalt to the electrode paste and allowing an in-situ, haphazard formation of a discontinuous, non-uniform cobalt hydroxide network, a continuous, uniform coating of cobalt hydroxide 4 is pre-formed in a manner analogous to that described in the '728 patent onto the nickel hydroxide active material particles before their incorporation into the electrode. This insures that the areas of inter-particle contact, as well as, the areas of contact between the active material and the substrate contain the required cobalt oxyhydroxide conductive material. (This cobalt oxyhydroxide is formed upon initial charging of the electrode from the pre-deposited cobalt hydroxide).

The present invention allows for a reduction in the total cobalt used in the electrode. This allows for a greater percentage of nickel hydroxide active material to be used in the electrode. Thus, a high percentage utilization of the nickel hydroxide material is achieved because there is good electrical interconnection between particles and between the particles and the substrate. Additionally, increased energy density is also achieved because the amount of cobalt used to achieve the interconnection is reduced allowing for more active material to be incorporated.

EXAMPLES

The capacity and utilization of prior art type comparative pasted electrodes using cobalt metal and cobalt oxide additives to the nickel hydroxide was first measured using small tri-electrode cells. In the first set of experiments the formation of the positive was similar to the process used on EV cells, described below. The utilization in this case was found to be above 90% with the gravimetric and volumetric energy densities at 176 mAh/g and 568 mAh/cc respectively. In a second set of experiments the electrodes were electrically formed at C10. In this case the utilization was found to similar or slightly better than the previous case.

A small tri-electrode cell for testing pasted electrodes was designed. The cell was fabricated by positioning a positive electrode (3 in$^2$ area) between two negatives and then placing the three electrode system inside a plastic bag in the presence of excess electrolyte. The negative electrodes were activated in 30% KOH at 75° C. for 3 hrs prior to assembling the cell. The three electrode system was then held in place by two plexiglass plates.

Ni-MH negative electrodes were prepared as described in copending U.S. patent application Ser. No. 08/027,973 from negative electrode materials having the formula

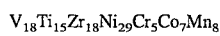

Before calculating the utilization of the tested electrodes, the Co, Ni, and Zn concentrations present in the spherical tri-precipitate nickel hydroxide active material and in the active material paste (spherical nickel hydroxide+Co+CoO) were measured. Table 1.1, below, shows the compositions of each sample. After the addition of Co and CoO the amount of atomic Ni—. present in the tri-precipitate decreases from 90 atomic wt % to 72 wt % in the material used for pasting. This corresponds to about 80 wt % of $Ni(OH)_2$ in the pasting material. The the ICP analysis (as shown in Table 1.1) species that the amount of the spherical tri-precipitate nickel hydroxide materials indicated only 5 wt % $Co(OH)_2$ and 5 wt % $Zn(OH)_2$.

TABLE 1.1

Atomic weight percent of Ni, Co, and Zn found in spherical nickel hydroxide tri-precipitate and in the active material paste. The samples were analyzed by ICP.

| Material | Ni (atomic wt %) | Co (atomic wt %) | Zn (atomic wt %) |
|---|---|---|---|
| spherical nickel hydroxide Tri-precipitate | 90 | 5 | 5 |
| Active Material Paste | 72 | 24 | 4 |

Using the 80 wt % $Ni(OH)_2$ present in the active material paste as a basis for calculation, the theoretical capacity of a 5 g comparative pasted electrode (3 in$^2$ area) can be calculated as follows:

Total weight of the positive: 5.00 g

Weight of a 3 in$^2$ foam: 0.93 g

Total weight of the powder: 5–0.93 g

Total $Ni(OH)_2$ weight: 4.07×0.80=3.25 g

Theoretical capacity: 3.25 g×0.289 Ah/g=0.94 Ah

The comparative samples were charged and discharged. A total of 6 cycles provided a stable electrode capacity. The electrodes were formed using the following formation process. The electrodes were charged at C40 for 24 hr followed by an additional charge of 24 hr at C10. The electrodes were then discharged at C10. Two more cycles were applied by charging the electrodes for 8 hrs at C10 and 9 hrs at C20 followed by discharge at C10. The last three cycles were performed at a C10 rate with a 110% overcharge.

It should be noted that the electrodes experienced a charge plateau at ~0.9 V that lasted for at least 12 hrs. This plateau has been attributed to the formation of the cobalt conduction network by the $Co(OH)_2 \rightarrow Co_3O_4$ and $Co_3O_4 \rightarrow CoOOH$ oxidation reactions.

Four comparative electrodes were prepared and tested. Their capacities are presented in table 1.2, below. These electrodes had an average capacity of 0.87 Ah (see Table 1.2).

TABLE 1.2

Electrode capacity and utilization of four comparative pasted electrodes tested in a tri-electrode cell.

| Sample | Weight (g) | Experimental Cap. (Ah) | Theoretical Cap. (Ah) | Utilization (%) |
|---|---|---|---|---|
| C1 | 4.87 | 0.86 | 0.91 | 94 |
| C2 | 5.05 | 0.88 | 0.95 | 93 |
| C3 | 5.00 | 0.88 | 0.94 | 94 |
| C4 | 4.89 | 0.85 | 0.92 | 92 |
| Average | | 0.87 | | 93 |

Utilization was obtained by comparing the experimental capacity with the theoretical capacity (using C3 as an example):

Utilization: 0.88/0.94=94%

The gravimetric energy density was calculated by dividing experimental capacity by the total weight of the 3 in$^2$ electrode (5 g excluding the electrode connector tab). The volumetric energy density was calculated as the capacity divided by the total volume of the electrode (1.55 cc). Again using C3 as an example:

Gravimetric Energy Density (mAh/g): 880/5=176

Volumetric Energy Density (mAh/cc): 880/1.55=568

Finally, measurements on two comparative pasted electrodes at a C/10 rate with 110% overcharge were performed. The 48 hr charging period at lower currents was not used in this case. As shown in Table 1.3 the initial capacity was quite low (0.56 Ah), but immediately improved on subsequent cycles yielding final capacities and utilizations slightly higher than those mentioned earlier. It could be that the long charging period of 48 hr at low current may not be necessary when using these cells. As judged by the plateau at ~1 V the formation process at a C/10 rate consumes less charge (~0.2 Ah) than the electrodes formed at lower rate (0.25 Ah). However the electrode capacity has improved.

TABLE 1.3

Electrode capacity and utilization of two comparative pasted electrodes tested in a tri-electrode cell. The electrodes were formed at C/10 without the 48 hr period of charging at low current.

| Weight (g) | Experimental Cap. (Ah) | Theoretical Cap. (Ah) | Utilization (%) |
|---|---|---|---|
| 4.93 | 0.89 | 0.92 | 97 |
| 4.95 | 0.89 | 0.93 | 96 |

Next, spherical nickel hydroxide powder was modified by precipitating cobalt hydroxide from a cobalt sulfate solution onto the nickel hydroxide particles. The resulting cobalt hydroxide layer increased the cobalt hydroxide content from 5 to 10 wt %. With this modified spherical powder it was possible to remove the metallic cobalt (Co) and cobalt oxide (CoO) additives completely from the active material paste. Utilization in these electrodes was over 95%, specific capacity was 189 mAh/g versus 180 mAh/g in standard comparative electrodes. This represents a 5% improvement in specific capacity.

The present invention involves precipitating Co(OH)$_2$ on the spherical nickel hydroxide powder before the preparation of the active material paste. This permits the formation an interconnected network of Co(OH)$_2$/CoOOH on the surface of the particle before electrode preparation in order to decrease or eliminate, the amount of Co and CoO needed in the pasted material.

Early work with thin films indicated the advantages of having a layer of CoOOH closer to the current collector. In this work, the current collector was nickel or gold foil onto which the metal hydroxide film had been deposited. Reasoning that the current collector is the external surface of the crystallites, the current inventors were able to conclude that a layer of Co(OH)$_2$ on this external surface would essentially behave as a thin film.

The original spherical nickel hydroxide powder used in the comparative pasted electrodes contained 5 wt % of Co(OH)$_2$ homogeneously distributed throughout the particles. For the present work, additional Co(OH)$_2$ was then precipitated on these particles from a CoSO$_4$ solution using KOH. Continuous stirring and dilute solutions of KOH were used to minimize large local concentration of OH$^-$ions. (Such local $^{-OH}$ concentrations promote the formation of discrete Co(OH)$_2$ particles separate from the spherical nickel hydroxide material.) Essentially, the present invention uses spherical nickel hydroxide powder particles as seeds for the formation of a new nickel hydroxide material.

The results obtained were from spherical nickel hydroxide powder enriched in Co(OH)$_2$ from a standard value of 5 wt % (in solid solution within the matrix of the nickel hydroxide powder particles) to 7.6 and 10.4 wt % (which includes both the solid solution and coating layer cobalt hydroxide). With the 7.6 wt % powder, pasted electrodes, containing 25% and 50% less Co and CoO than the comparative examples, were prepared. The spherical nickel hydroxide powder enriched to 10.4 wt % cobalt hydroxide was tested without the use of any Co or CoO additives in the pasted electrode.

Using the same tri-electrode cell described in the comparative examples above, the modified versions of nickel hydroxide pasted electrodes were tested. A typical comparative baseline was prepared by mixing spherical nickel hydroxide (5 wt % Zn(OH)$_2$, 5 wt % Co(OH)$_2$, 90 wt % Ni(OH)$_2$) with Co and CoO. The amounts of every component, and the total weight percent are shown in Table 2.1.

TABLE 2.1

Weight and weight percent of the components used in a comparative electrode. The spherical nickel hydroxide precipitate (86.2 g) contains 5 wt % Co(OH)$_2$ and 5 wt % Zn(OH)$_2$.

| | | | |
|---|---|---|---|
| spherical nickel hydroxide Tri-precipitate Powder | Ni(OH)$_2$ | 77.58 g | 80 wt % |
| | Co(OH)$_2$ | 4.31 g | 4.5 wt % |
| | Zn(OH)$_2$ | 4.31 g | 4.5 wt % |
| As Analyzed | | | |
| CoO | CoO | 5.82 g | 6.0 wt % |
| Co | Co | 4.57 g | 4.7 wt % |
| | Total | 96.59 g | |

In the comparative examples above, a utilization of 96–97% was obtained after six cycles at C/10 with 110% overcharge. Additional measurements with similar electrodes have confirmed these results. Table 2.2 shows a total of five electrodes where the average utilization was 97%. The first two electrodes in the table were taken from the comparative examples of table 1.2. The initial capacity is low but improves rapidly and remains stable after six cycles.

TABLE 2.2

Electrode capacity and utilization of comparative pasted electrodes tested in a tri-electrode cell. The electrodes were formed at a C/10 rate.

| Weight (g) | Experimental Cap. (Ah) | Theoretical Cap. (Ah) | Utilization (%) |
|---|---|---|---|
| 4.93 | 0.89 | 0.92 | 97 |
| 4.95 | 0.89 | 0.93 | 96 |
| 4.80 | 0.87 | 0.89 | 98 |
| 4.92 | 0.88 | 0.92 | 96 |
| 4.81 | 0.87 | 0.89 | 98 |
| Average | | | 97 |

The theoretical capacities of the additional comparative examples shown in the table were obtained by first calculating the total amount of $Ni(OH)_2$ present in the electrode. For example, for the first electrode shown in Table 2.1 the theoretical capacity was calculated as shown below:

Total weight of the positive: 4.93 g

Weight of a 3 $in^2$ foam: 0.93 g

Total weight of the powder: 4.93–0.93=4.00 g

The total $Ni(OH)_2$ weight was then calculated by multiplying the total weight of the powder by 0.80 (only 80 wt % of the powder is pure $Ni(OH)_2$), Total $Ni(OH)_2$ weight: 4.00×0.80=3.2 g and since 1 g of $Ni(OH)_2$ is equivalent to 0.289 Ah, the capacity expected from 3.2 g was:

Theoretical capacity: 3.2 g×0.289 Ah/g=0.92 Ah

The utilization of the electrode was then obtained by comparing the capacity measured in the last cycle (0.89 Ah) with the theoretical capacity:

Utilization: 0.89/0.92=97%

The gravimetric energy density was calculated by dividing the experimental capacity by the total weight of the 3 $in^2$ electrode (4.93 g without the tab). The volumetric energy density was calculated as the capacity divided by the total volume of the electrode (1.57 cc):

Gravimetric Energy Density (mAh/g): 890/4.93=180

Volumetric Energy Density(mAh/cc): 890/1.57=565

Before the preparation of the modified electrodes the $CO(C)H)_2$ content of the spherical nickel hydroxide material was increased by precipitating $Co(OH)_2$ from a $CoSO_4$ solution. The precipitation was performed by adding approximately 73 ml of 0.5 M $CoSO_4$ solution to 110 g of spherical nickel hydroxide powder. This corresponds to 3.4 g of additional $Co(OH)_2$. The amount of cobalt in the sulfate solution was calculated to theoretically increase the total $Co(OH)_2$ content of the nickel hydroxide particles from approximately 5 wt % to 8 wt %. Then while continuously and vigorously stirring the solution with the added particles, KOH 0.1N was added drop by drop until the pH increased to 8. At that point the stirring was stopped and the powder particles were allowed to settle at the bottom of the beaker. The solution on top was clear and without the characteristic reddish color of cobalt cations in solution. The precipitate was then rinsed several times with distilled water to remove excess sulfate and dried in the oven at 60 degree C. By ICP analysis the coated nickel hydroxide was found to contain a total (solid solution and coated ) of 7.6 wt % $Co(OH)_2$. The new composition of the modified spherical nickel hydroxide material was 87.5 wt % $Ni(OH)_2$, 4.9 wt % $Zn(OH)_2$, and 7.6 wt % $Co(OH)_2$. Using this powder the relative ratios of the components in the active material paste were changed by decreasing the Co and CoO content by 25% (see Table 2.3, below). The total weight percent of $Ni(OH)_2$ in the paste was 80 wt %, which is similar to the nickel hydroxide content found in the comparative electrodes.

TABLE 2.3

Weight and weight percent of the components used in a modified electrode. The spherical nickel hydroxide precipitate (91.5 g) contains 7.6 wt % $Co(OH)_2$ and 4.9 wt % $Zn(OH)_2$. The Co and CoO content was decreased by 25% (see Table 2.1).

| spherical nickel hydroxide tri-precipitate powder as analyzed | $Ni(OH)_2$ | 80.0 g | 80 wt % |
|---|---|---|---|
| | $Co(OH)_2$ | 6.95 g | 7 wt % |
| | $Zn(OH)_2$ | 4.48 g | 4.5 wt % |
| CoO | CoO | 4.37 g | 4.4 wt % |
| Co | Co | 3.43 g | 3.5 wt % |
| | Total | 99.23 g | |

Table 2.4 shows the results obtained with two of the modified electrodes. The utilization of 95% was very close to the values of the comparative electrodes. The gravimetric energy densities were also very similar. The volumetric energy density was higher since the electrode was thinner (31 mil). The energy densities for one electrode were:

Gravimetric Energy Density (mAh/g): 900/4.92=183

Volumetric Energy Density (mAh/cc): 900/1.525=590

TABLE 2.4

Electrode Capacity and Utilization of two modified pasted electrodes with 25% less Co and CoO used as additives in the active material paste.

| Weight (g) | Experimental Cap. (Ah) | Theoretical Cap. (Ah) | Utilization (%) |
|---|---|---|---|
| 4.92 | 0.90 | 0.95 | 95 |
| 4.94 | 0.90 | 0.95 | 95 |
| Average | | | 95 |

During charging, of the modified electrodes, a low voltage plateau was observed during the first cycle, but it developed for a short time (less than two hours). This was to be expected because of the smaller amount of Co and CoO used during electrode preparation. Based on the capacities measured and the energy densities calculated it can be concluded that a 25% decrease in Co and CoO did not affect the utilization and the electrode capacity of electrodes prepared with the modified spherical nickel hydroxide powder. Results show that the extra $Co(OH)_2$ added was formed on the surface of the spherical nickel hydroxide powder.

Next, using the modified spherical nickel hydroxide powder (7.6 wt % in $Co(OH)_2$), the Co and CoO content in the paste was decreased by 50% (as compared with the comparative examples). The final amounts used for the preparation of the pasted electrodes are shown in Table 2.5.

TABLE 2.5

Weight and weight percent of the components used in a modified electrode. The modified spherical nickel hydroxide precipitate (94.1 g) contains 7.6 wt % $Co(OH)_2$. The Co and CoO content has been decreased by approximately 50% (compare with Table 2.1).

| spherical nickel hydroxide Tri-precipitate Powder As Analyzed | $Ni(OH)_2$ | 82.3 g | 82.6 wt % |
|---|---|---|---|
| | $Co(OH)_2$ | 7.16 g | 7.2 wt % |
| | $Zn(OH)_2$ | 4.61 g | 4.6 wt % |
| CoO | CoO | 2.91 g | 2.92 wt % |
| Co | Co | 2.58 g | 2.59 wt % |
| | Total | 99.59 g | |

Note that the total $Ni(OH)_2$ content in the final paste was 82.6 wt %. The utilization of the electrodes, using this paste, changed little compared with the comparative electrodes (see, Table 2.6). The gravimetric and volumetric energy densities were also very similar. The energy densities for one electrode are shown below:

Gravimetric Energy Density (mAh/g): 930/5.08=183

Volumetric Energy Density (mAh/cc): 930/1.623=573
This electrode was thicker (33 mil) and therefore the volumetric energy density Was lower.

During charging of these electrodes, a low voltage plateau was observed during the first cycle, but it developed for a short time. This was to be expected since less CoOOH is being formed from the Co and CoO added to this electrode. These results indicate that a 50% decrease in Co and CoO does not effect utilization or electrode capacity of electrodes prepared with the modified spherical nickel hydroxide powder of the invention.

TABLE 2.6

Electrode capacity and utilization of modified pasted electrodes with 50% less Co and CoO to the active material paste.

| Weight (g) | Experimental Cap. (Ah) | Theoretical Cap. (Ah) | Utilization (%) |
|---|---|---|---|
| 5.08 | 0.93 | 0.98 | 95.0 |
| 5.09 | 0.92 | 0.98 | 94.0 |
| Average | | | 94.5 |

Based on the results obtained with 25 and 50% reduction in Co and CoO these additives were completely removed from the pasted material and the $Co(OH)_2$ content in the modified spherical nickel hydroxide powder was further increased. The precipitation procedure was similar, however, the concentration of $CoSO_4$ was increased from 0.5 to 1.0 M. Therefore, approximately 73 ml of 1 M solution of $CoSO_4$ were added to 110 g of spherical nickel hydroxide powder. This corresponded to 6.77 g of additional $Co(OH)_2$ formed on the 110 g of the spherical nickel hydroxide powder. ICP analysis confirmed an increase from 5 wt % (in the raw spherical nickel hydroxide powder) to 10.4 wt % (in and around the spherical nickel hydroxide powder). Using this powder, pasted electrodes were prepared without using metallic Co or CoO as additives (see Table 2.7). Note that the total $Ni(OH)_2$ content increased to 84.7 wt %.

TABLE 2.7

Weight and weight percent of the components used in a modified electrode. Based on ICP analysis the modified spherical nickel hydroxide precipitate (86.01 g) contains 10.43 wt % $Co(OH)_2$, and 4.85 wt % $Zn(OH)_2$ and 84.72 wt % $Ni(OH)_2$. Metallic Co and CoO additives were not used in this case.

| spherical nickel hydroxide Tri-precipitate Powder As Analyzed | | | |
|---|---|---|---|
| | $Ni(OH)_2$ | 72.86 g | 84.7 wt % |
| | $Co(OH)_2$ | 8.97 g | 10.4 wt % |
| | $Zn(OH)_2$ | 4.17 g | 4.8 wt % |
| CoO | | none | |
| Co | | none | |
| | Total | 86.0 g | |

Table 2.8 shows the results obtained with four electrodes using this 10.4% modified powder. The utilization did not decrease compared with the comparative examples. The cycling profile of a representative modified electrode shows that by the end of the second cycle the electrodes achieved full capacity. Again the overcharge potential was very similar to the comparative electrodes and the plateau observed during the first cycle was very much suppressed. Since there was no addition of Co or CoO this plateau is believed to result from the $Co(OH)_2 \rightarrow CoOOH$ oxidation reaction.

TABLE 2.8

Electrode capacity and utilization of pasted electrodes prepared with a modified spherical nickel hydroxide powder in the absence of Co or CoO in the active material paste.

| Weight (g) | Experimental Cap. (Ah) | Theoretical Cap. (Ah) | Utilization (%) |
|---|---|---|---|
| 4.46 | 0.86 | 0.86 | 100 |
| 4.64 | 0.87 | 0.91 | 96 |
| 4.60 | 0.86 | 0.90 | 95 |
| 4.52 | 0.86 | 0.88 | 98 |
| Average | | | 97 |

If one considers the gravimetric and volumetric energy densities (see Table 2.9) the electrodes performed better than the comparative electrodes.

TABLE 2.9

Gravimetric and volumetric energy density of pasted electrodes prepared with a modified spherical nickel hydroxide powder in the absence of Co and CoO in the active material paste.

| Weight (g) | Gravimetric Energy Density (mAh/g) | Volumetric Energy Density (mAh/cc) |
|---|---|---|
| 4.46 | 193 | 583 |
| 4.64 | 187 | 590 |
| 4.60 | 187 | 583 |
| 4.52 | 190 | 583 |
| Average | 189 | 585 |

The usefulness of the $CO(C)H)_2$ precipitation is even more evident if one compares these results with baseline measurements. These are shown in Table 2.10. Here the Co and CoO were removed and the electrodes prepared with standard spherical nickel hydroxide material. As shown by the results the electrodes performed poorly when the additives were removed. The utilization dropped to 70% and the gravimetric energy density went down to 152 mAh/g.

TABLE 2.10

Electrode capacity and utilization of pasted electrodes with no Co or CoO added to the active material paste. The powder used was standard spherical nickel hydroxide.

| Weight (g) | Experimental Cap. (Ah) | Theoretical Cap. (Ah) | Utilization (%) |
|---|---|---|---|
| 5.37 | 0.82 | 1.15 | 71 |
| 5.36 | 0.80 | 1.15 | 69 |
| Average | | | 70 |

Based on experiments performed on tri-electrode cells it can be concluded that the cobalt and the cobalt oxide additives can be significantly reduced from pasted electrodes after modifying the standard spherical nickel hydroxide powder. This modification involves the chemical precipitation of cobalt hydroxide on the spherical nickel hydroxide material. By using this technique, the cobalt hydroxide content was increased from 5 wt % to 10 wt %. With the 10 wt % enriched powder the cobalt and the cobalt oxide can be completely removed from the electrodes without affecting the electrode performance.

Next, spherical nickel hydroxide powder was modified by precipitating cobalt hydroxide from a cobalt sulfate solution. This resulted in a cobalt hydroxide layer where the cobalt hydroxide content was increased from 5 wt % to 7.7 wt %, 10 wt % and 12.7 wt %. With this modified spherical nickel hydroxide powder, electrodes were prepared without added metallic cobalt and cobalt oxide. Measurements performed with tri-electrode cells, at a rate of C/10, have demonstrated that the best results were obtained with electrodes prepared with 10 wt % and 12.7 wt % cobalt hydroxide. The utilization of these electrodes was over 96%. The specific capacity was 187–188 mAh/g versus 178–180 mAh/g observed in comparative electrodes.

In these experiments additional results with pasted electrodes enriched in cobalt hydroxide from a standard value of 5 wt % to 7.7, 10, and 12.7 wt % in the absence of cobalt and cobalt oxide in the active material paste are presented. The experiments disclosed below were performed at a charging rate of C/10.

Baseline measurements with comparative positive electrodes were performed using the tri-electrode cells described above. The electrodes were prepared with cobalt and cobalt oxide additives where the standard total nickel hydroxide content was 80 wt %. The results obtained at C/10 were comparable to the previous data. As shown in Table 3.1 the utilization and energy density were 94.5% and 178.5 mAh/g, respectively, after six cycles. In the previous examples a utilization of 97% after six cycles at C/10 with 110% overcharge was achieved.

cipitation of the cobalt, the modified spherical nickel hydroxide was filtered, rinsed, dried, and analyzed by ICP. The amount of cobalt hydroxide incorporated into the final precipitate was adjusted by changing the volume of cobalt sulfate added initially to the spherical nickel hydroxide powder. This additional cobalt hydroxide is formed on the surface of the spherical nickel hydroxide powder particles.

Table 3.2 shows the results obtained with four electrodes prepared with this modified spherical nickel hydroxide enriched in cobalt hydroxide to 7.7 wt % (again, this number includes the initial 5% cobalt in solid solution with the nickel hydroxide). The pasted electrodes were prepared in the absence of cobalt and cobalt oxide additives to the paste. At C/10 the utilization decreased from the standard value of 94.5%, shown in the previous section, to 88%. This drop in capacity most probably corresponds to a lower electronic conductivity between the particles since the amount of cobalt hydroxide used in this electrode was only 2.7 wt % above the standard 5 wt % contained in the triprecipitate. At C/2 the utilization decreased to 55% probably for the same reason.

TABLE 3.1

Weight, electrode capacity, energy density, and utilization of comparative pasted electrodes prepared with spherical nickel hydroxide in the presence of Co and CoO added to the active material paste (80 wt % in nickel hydroxide). The electrodes were formed and tested at C/10.

| Weight (g) | Experimental Capacity (Ah) | Theoretical Capacity (Ah) | Gravimetric Energy Density (mAh/g) | Utilization (%) |
|---|---|---|---|---|
| 5.11 | 0.91 | 0.97 | 178 | 94 |
| 5.09 | 0.91 | 0.96 | 179 | 95 |
| Average | | | 178.5 | 94.5 |

Based on previous results, pasted electrodes with increased amounts of precipitated cobalt hydroxide were prepared. Experiments were performed with spherical nickel hydroxide tri-precipitate enriched in cobalt hydroxide to 7.7 wt %, 10 wt % and 12.7 wt % in the absence of cobalt and cobalt oxide in the active material paste. The total cobalt hydroxide content of the unmodified spherical nickel hydroxide tri-precipitate was initially 5 wt %. The precipitation procedure was similar to the one described above: 1M KOH was added drop by drop to a solution containing cobalt sulfate and spherical nickel hydroxide powder. After pre-

TABLE 3.2

Weight, electrode capacity, energy density, and utilization of pasted electrodes prepared with modified spherical nickel hydroxide (7.7 wt % Co(OH)$_2$, 87.4 wt % Ni(OH)$_2$, 4.9 wt % Zn(OH)$_2$) in the absence of Co or CoO added to the active material paste. The electrodes were formed and tested at C/10.

| Weight (g) | Experimental Capacity (Ah) | Theoretical Capacity (Ah) | Gravimetric Energy Density (mAh/g) | Utilization (%) |
|---|---|---|---|---|
| 4.92 | 0.90 | 1.00 | 183 | 90 |
| 5.03 | 0.93 | 1.04 | 185 | 89 |
| 4.99 | 0.89 | 1.03 | 178 | 86 |
| 5.05 | 0.92 | 1.04 | 182 | 88 |
| Average | | | 182 | 88 |

Table 3.3 shows the results obtained with two electrodes prepared with modified spherical nickel hydroxide enriched to 10 wt % in cobalt hydroxide. Again, the electrodes were prepared in the absence of Co and CoO in the active material paste. At C/10 the utilization was close to the values obtained for the comparative electrodes. The energy density, however, was higher by 4 to 5%. The better performance of these electrodes (with a higher cobalt hydroxide content) agree with the postulated mechanism of conduction mentioned earlier.

decreased in pasted nickel hydroxide electrodes after modifying the standard spherical nickel hydroxide powder. The modification involves the chemical precipitation of cobalt hydroxide onto the powder particles of spherical nickel hydroxide material. Using this method the cobalt hydroxide

TABLE 3.3

Weight, electrode capacity, energy density, and utilization of pasted electrodes prepared with modified spherical nickel hydroxide (10 wt % $Co(OH)_2$, 85 wt % $Ni(OH)_2$, 5 wt % $Zn(OH)_2$) without Co or CoO added to the active material paste. The electrodes were formed and tested at C/10.

| Weight (g) | Experimental Capacity (Ah) | Theoretical Capacity (Ah) | Gravimetric Energy Density (mAh/g) | Utilization (%) |
|---|---|---|---|---|
| 4.66 | 0.87 | 0.92 | 187 | 95 |
| 4.65 | 0.87 | 0.91 | 187 | 96 |
| Average | | | 187 | 95.5 |

Table 3.4 shows the results obtained with four electrodes prepared with modified spherical nickel hydroxide enriched to 12.7 wt % cobalt hydroxide. Once again, the electrodes were prepared in the absence of Co and CoO in the active material paste. At C/10 the energy densities were very similar to the values measured with the electrodes describe above. The utilization, however, was higher (99%). Preliminary results at C/2 have show only a slight decrease in utilization (96%).

content was increased from 5 wt % to 7.7 wt %, 10 wt % and 12.7 wt %. Only with the electrodes made with 10 and 12.7 wt %. cobalt enrichment could be produced with no cobalt and cobalt oxide additives without affecting the electrode capacity at C/10.

In the above examples, modified nickel hydroxide particles were prepared by precipitation of divalent cobalt hydroxide onto nickel hydroxide particles. The nickel hydroxide particles were immersed into cobalt sulfate solu-

TABLE 3.4

Weight, electrode capacity, energy density, and utilization of pasted electrodes prepared with modified spherical nickel hydroxide (12.7 wt % $Co(OH)_2$, 83 wt % $Ni(OH)_2$, 4.3 wt % $Zn(OH)_2$) in the absence of Co or CoO added to the active material paste. The electrodes were formed and tested at C/10.

| Weight (g) | Experimental Capacity (Ah) | Theoretical Capacity (Ah) | Gravimetric Energy Density (mAh/g) | Utilization (%) |
|---|---|---|---|---|
| 4.50 | 0.84 | 0.86 | 187 | 98 |
| 4.45 | 0.84 | 0.84 | 189 | 100 |
| 4.50 | 0.83 | 0.86 | 184 | 97 |
| 4.45 | 0.85 | 0.84 | 191 | 101 |
| Average | | | 188 | 99 |

Table 3.5 shows the results obtained in C-cells that embody the present invention. These C-cells were prepared using a nickel hydroxide positive electrode materials that contained modified spherical nickel hydroxide enriched to 10% cobalt hydroxide, 5 wt % cobalt powder, 3 wt % CoO, and 0.3 wt % PVA binder. Control C-cells were fabricated using standard nickel hydroxide positive electrode material. At C/2 the internal cell pressure during cycling was markedly better than the internal pressure of the control cells.

tion. Potassium hydroxide solution was slowly added to the stirred solution to precipitate divalent cobalt hydroxide onto the suspended nickel hydroxide particles. This provided an encapsulation of the particles with cobalt hydroxide.

In some cases, the beneficial effects of the cobalt hydroxide encapsulation can be interfered with when there is opportunity to dissolve the cobalt hydroxide into the battery electrolyte prior to the initial battery charge. For example, during high temperature heat treatment of nickel metal

TABLE 3.5

Internal pressure (PSI) in C-cells of the present invention prepared with modified spherical triprecipitate nickel hydroxide containing 10 wt % $Co(OH)_2$, 5 wt % $Zn(OH)_2$, and 85 wt % $Ni(OH)_2$; as additives 5 wt % Co and 5 wt % CoO; and 3 wt % PVA binder. The electrodes were formed and tested at C/2.

| Cycles | 1 | 50 | 100 | 150 | 200 | 250 | 300 | 350 | 400 | 450 | 500 |
|---|---|---|---|---|---|---|---|---|---|---|---|
| control | 180 | 250 | 320 | 360 | 380 | — | — | — | — | — | — |
| embodiment | 100 | 120 | 130 | 150 | 170 | 170 | 180 | 170 | 170 | 150 | 150 |

Based on examples above, it can be concluded that the cobalt and the cobalt oxide additives can be significantly hydride cells prior to the first formation charge, dissolution and migration of the cobalt hydroxide encapsulate can result in substantial capacity loss. To overcome this, heat treatment can be avoided. Alternatively, a more stable form of the cobalt hydroxide encapsulate can be prepared.

By a simple modification of the above process to encapsulate the nickel hydroxide particles with divalent cobalt hydroxide, the encapsulate can be converted to the more stable trivalent cobalt oxyhydroxide form. After completion of the precipitation of the cobalt hydroxide, additional 0.1N KOH is added dropwise until the pH is shifted from 8 to 14. This shifts the oxidation potential of the divalent cobalt so that it can be rapidly oxidized by oxygen. The resulting alkaline suspension of modified nickel hydroxide is then stirred in air over night to facilitate air oxidation of the cobalt hydroxide coating. Completion of the oxidation is evident as the modified nickel hydroxide turns from light green to dark brown in color. There is no oxidation of the underlying nickel hydroxide particles because nickel hydroxide is oxidized at a higher potential than cobalt hydroxide. The resulting suspension is carefully filtered, rinsed to remove excess alkalinity, and dried prior to using the modified nickel hydroxide powder to prepare electrodes. The cobalt oxyhydroxide encapsulate is more stable than the divalent cobalt hydroxide encapsulate due to the much lower solubility of the cobalt oxyhydroxide. The cobalt oxyhydroxide encapsulate is more generally useful since it does not suffer significant dissolution even during an extended alkaline heat treatment.

Experiments were performed using spherical nickel hydroxide encapsulated with cobalt oxyhydroxide as described above. The nickel hydroxide was enriched with 5 wt % additional cobalt oxyhydroxide encapsulation. This material was mixed with 3 wt % CoO and 5 wt % Co powder to produce pasted nickel hydroxide electrodes. Tests in trielectrode cells indicated a gravimetric energy density of 185 mAh/g. Tests in c-cells indicated 176 mAh/g showing a 3% improvement over baseline results.

Another way to produce nickel hydroxide particles with a stable cobalt oxyhydroxide encapsulate is by reacting chemically oxidized nickel hydroxide particles suspended in water with cobalt metal powder. Nickel hydroxide powder is oxidized with sodium hypochlorite. It is then rinsed and dried. It is mixed with about 10 wt % cobalt powder. After an induction period, the nickel oxyhydroxide will oxidize the cobalt metal to cobalt oxyhydroxide in an exothermic reaction. An excellent encapsulated coating of cobalt oxyhydroxide results.

It is also not necessary that the conductive coating of the present invention be limited to cobalt hydroxide or oxyhydroxide. The conductivity properties of cobalt oxyhydroxide are shared by other higher metallic hydroxides and oxides. For example, gamma-manganese dioxide has substantial conductivity, stays oxidized throughout the range of operation of the nickel hydroxide electrode, and has a low solubility.

While the modification of nickel hydroxide is described in relation to spherical nickel hydroxide material (a 5 wt % $Zn(OH)_2$, 5 wt % $Co(OH)_2$, 90 wt % $Ni(OH)_2$ solid solution material), the methods and products of the present invention are equally applicable to the nickel hydroxide solid solution active materials of the parent application.

The improved capacity of the nickel hydroxide materials of the parent application relates to the material's multiphase disordered structure, γ-phase stability, multiple electron transfer capabilities, increased conductivity, and their interaction with unique formulated electrolytes. While each of these characteristics are discussed separately, it is believed that they are all interrelated.

The formation of γ-phase material is desirable because γ-phase material is capable of multiple electron transfers. Higher capacity batteries using γ-phase materials have, up until now, not been possible because γ-phase material could not be stabilized.

In prior art nickel hydroxide solid solution materials, cobalt was added to improve stability and encourage multiple electron transfer. It was theorized that cobalt stabilized γ-phase materials because its presence creates excess positive charge in the nickel hydroxide plates that results in the intercalation of anions, such as $CO_3^{2-}$, and water molecules between the plates to compensate for excess positive charge. In such material, fractionally more than one electrode is transferred. However, this effect is short lived.

The positive electrode material described in U.S. Pat. No. 5,344,728 (the grand parent of the present application) is a disordered active material consisting of a 10% coprecipitated cobalt active material with layers of enriched cobalt substituted on the electrode surface. This material contains a nominal percentage of stabilized γ-phase material as a result of its disordered microstructure. Building on this work with disordered nickel hydroxide materials, it was found that predominantly γ-phase nickel hydroxide materials that are multi-phased could be produced and the stability of the γ-phase of these materials could be significantly improved. The nickel hydroxide positive electrode materials of the parent application, U.S. Pat. No. 5,348,822, because of their disordered nature, exhibit stable multiple electron transfer.

These materials also exhibit density changes that result in a higher surface area such that the electrolyte reactants within the nickel hydroxide have better catalysis, in addition, the conductivity is improved by the formation of filamentous conductive regions that extend from areas of high conductivity immediately adjacent to the nickel current collector to the exterior of individual nickel hydroxide particles. Thus, nickel hydroxide electrodes of the parent application have increased conductivity between the active material and the nickel current collector independent from the conductive cobalt hydroxide coatings of the present invention.

The disordered materials of the parent application are compositionally and/or structurally disordered. "Compositionally disordered" as used herein is specifically defined to mean that this material contains at least one compositional modifier and/or a chemical modifier. The at least one compositional modifier may be a metal, a metallic oxide, a metallic oxide alloy, a metal hydride, and/or a metal hydride alloy. Preferably, the compositional modifier is chosen from the group consisting of Al, Bi, Co, Cr, Cu, Fe, In, La, Mn, Ru, Sb, Sn, Ti, and Zn. The chemical modifier is chosen from the group consisting of Al, Ba, Ca, Co, Cr, Cu, F, Fe, K, Li, Mg, Mn, Na, St, and Zn.

"Structurally disordered" as used herein is specifically defined to mean having a more conductive surface, filamentous regions of higher conductivity, and multiple or mixed phases where α, β, and γ-phase regions may exist individually or in combination. The disordered materials of the parent application contain 8 to 30 atomic percent; preferable 10 to 20 atomic percent of at least one of the compositional modifiers or chemical modifiers described above. Materials of the parent application are formed when a compositional modifier is incorporated into the material itself, as distinguished from the cobalt hydroxide formed as a layer upon the particles of the material, which increases conductivity of the active material. These compositional modifiers tend to disrupt the formation of large crystallites which can lead to higher resistance materials. The increased disorder due to smaller crystallites tends to provide electronic conductivity of the bulk active material not present in more crystalline forms. Further, the local disorder caused by distortions surrounding these modifiers has a similar effect. These materials can also be formed through charge and discharge treatments, particularly pulsed charging/discharging that encourage disorder, the formation of microcracks, and a reduction in particle size.

In order to form disordered materials containing 8 to 30 atomic percent chemical and compositional modifiers, several processing variations may be utilized including coprecipitation of any number of compositional modifiers in a chemical conversion impregnation or electrochemical impregnation process, including that of high density, spherical type materials. These active materials may be used in all types of nickel battery positive electrodes including sintered electrodes, foam type pasted electrodes and fiber type pasted electrodes. The modifiers may be added to conversion electrolytes during impregnation, formation, or activation, or directly to the electrolyte in a sealed or vented cell.

The disordered materials are multiphase polycrystalline materials having at least one γ-phase that contains compositional modifiers or combinations of compositional and chemical modifiers that promote the multiphase structure and the presence of γ-phase materials. These compositional modifiers are chosen from the group consisting of Al, Bi, Co, Cr, Cu, Fe, In, La, Mn, Ru, Sb, Sn, Ti, and Zn. Preferably, at least 3 compositional modifiers are used.

As a result of their disordered structure and improved conductivity, these materials do not have distinct oxidation states such as $2^+$, $3^+$, or $4^+$. Rather, these materials form graded systems that pass 1.2 to 2 electrons.

The materials of the present invention are also distinguished over the prior art by the non-substitutional incorporation of at least one chemical modifier around the plates of the nickel hydroxide electrode material. The phrase "non-substitutional incorporation around the plates", as used herein means the incorporation into interlamellar sites or at edges of plates. These chemical modifiers are preferably chosen from the group consisting of Al, Ba, Ca, Co, Cr, Cu, F, Fe, K, Li, Mg, Mn, Na, Sr, and Zn.

Contrary to the prior art, these nickel hydroxide positive electrode materials are disordered materials. The use of disordered materials permits permanent alteration of the properties of the material by engineering the local and intermediate range order. The general principals of this are discussed in U.S. Pat. No. 4,623,597, the contents of which are hereby incorporated by reference. These disordered nickel hydroxide positive electrode materials are multiphase materials having a polycrystalline γ-phase that can additionally contain at least one structure selected from the group consisting of (i) amorphous; (ii) microcrystalline; (iii) polycrystalline lacking long range compositional order with three or more γ-phases of said polycrystalline structure; and (iv) any combination of said amorphous, microcrystalline, or polycrystalline structures.

Another reason for the improved performance of the nickel hydroxide materials of the present invention is that the chemical modifiers provide for electronic overlap between adjacent nickel hydroxide plates thereby increasing the inherent conductivity of the nickel hydroxide material. This latter possibility was considered previously (see, Corrigan, et al., et al, 90-4 *Proceedings of the Symposium on Nickel Hydroxide Materials* 97 (1990). However, the prior art does not teach that major gains in specific capacity can be achieved by the incorporation of chemical modifiers between plates of disordered material such that these chemical modifiers provide electronic overlap through spatially extended d-orbitals as in the present invention.

Compositional modifiers are incorporated into the nickel hydroxide electrode material using, for example, conventional precipitation procedures. Electrolyte ions can be incorporated into the interlamellar regions, for example, during oxidation in alkaline electrolyte solution. Chemical modifiers can be incorporated into non-substitutional sites in the interlamellar regions, for example, by treatment of oxidized nickel hydroxide materials with salt solutions. The incorporation of combinations of compositional modifiers, electrolyte ions, and chemical modifiers are believed to be especially useful.

In one method, oxidized nickel hydroxide is treated with metal nitrate salt solution and with metal hydroxides then precipitated by cathodic deposition from this nitrate solution. In another method, the oxidized nickel hydroxide is treated with metal salt solution with metal hydroxide and then precipitated by subsequent treatment with alkaline solution. Oxidized nickel hydroxide material could be prepared by electrochemical oxidation in alkaline solution or by treatment with a suitable chemical oxidant such as hydrogen peroxide or sodium hypochlorite.

The choice of disordered materials has fundamental scientific advantages: as seen, a substantial number of elements can be included in the lists of modifiers. These elements offer a variety of bonding possibilities due to the multi-directionality of d-orbitals. The multi-directionality of d-orbitals provides for a tremendous increase in density. A considerable increase in electron transfer capacity is possible in the disordered alloys compared to crystalline structures of the prior art. The preparation of disordered alloys produces large numbers of grain boundaries and a large surface area leading to the increased conductivity and hydrogen diffusion, and subsequently, multiple electron transfer of the materials of the present invention. Thus, in addition to compositional disorder, there occurs topological disorder at phase boundaries of the multi-phase alloy. This increases enormously the density of catalytic sites.

The material has been observed to transfer up to 1.52 electrons per atom during reversible cycling. Cycling tests indicate that multiple electron transfers remain stable throughout the life of the cell. Thus, it is expected that cells fabricated using these materials would exhibit excellent capacity throughout their lives.

These materials can be prepared in some circumstances by first oxidizing the nickel hydroxide electrode material so that many of the nickel ions are in the 3+ state. The nickel hydroxide electrode material is then treated with a cation solution, such as by dipping, rinsing, or spraying. The treated material is then reduced, triggering the reaction shown in this equation (where M is a metal ion):

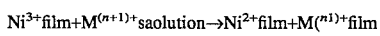

$$Ni^{3+}film + M^{(n+1)+}solution \rightarrow Ni^{2+}film + M^{(n)+}film$$

As a result of this reaction, chemical modifiers are non-substitutionally incorporated around the plates of the nickel hydroxide electrode material. This reaction can be accomplished electrochemically or chemically. A chemical method, for example could be accomplished by placing electrode powder in an oxidizing solution, treating the oxidized powder with a cation solution, and triggering the oxidation of the treated powder using hot water. The resulting powder could then be pasted onto a foamed nickel substrate. An electrochemical method, could be accomplished by oxidizing formed nickel hydroxide material electrochemically, dipping the oxidized material in a cation solution, and using a current to trigger the oxidation reaction. Variations of these methods such as a chemical oxidation and an electrochemical reduction or a electrochemical reduction and a chemical reduction are alternative methods.

Other methods of preparing the disordered materials are activation methods that involve a 200–300% increase in current density, a pulsed or intermittent charge/discharge treatment, or both increased current density and a pulsed treatment. Nickel hydroxide positive electrode materials produced by these methods have a capacity greater than the 289 mAh/g theoretical capacity considering only single electron transfer.

Additional improvement of the disordered material are possible when these disordered materials are combined with electrolytes where the electrolyte comprises at least one element chosen from the group consisting of Ba, Ca, Cs, K, Na, Ra, Rb, and St, combined with at least one member of the group consisting of Br, Cl, F, OH. Particular examples of such electrolytes are formulations of KOH and CsF and KOH and CsOH.

It is obvious to those skilled in the art that these positive electrode materials may be prepared by additional methods without departing from spirit and scope of the present invention.

The drawings, discussion, descriptions, and examples of this specification are merely illustrative of particular embodiments of the invention and are not meant as limitations upon its practice. In particular, Ni—Cd and Ni—MH cells are specifically discussed, however, the positive electrodes of the present invention can be used with any Ni based negative cell, such as NiZn and NiFe. Thus, it is the following claims, including all equivalents, that define the scope of the invention.

We claim:

1. A positive electrode material for the formation of a paste for fabricating positive electrodes comprising:

particles of a nickel hydroxide positive electrode material; and a precursor coating of a substantially continuous, uniform encapsulant layer precipitated on said particles prior to preparation of active material paste, said encapsulant layer formed from a material that upon oxidation during processing or during charging increases resistance to corrosion products, increases the conductivity of said particles, and does not revert to its precharge form upon subsequent discharge;

where said nickel hydroxide additionally includes at least three compositional modifiers chosen from the group consisting of Al, Bi, Co, Cr, Cu, Fe, In La Mn, Ru, Sb, Ti, and Zn and at least one chemical modifier chosen from the group consisting of Al, Ba, Ca, Co, Cr, Cu, F, Fe, K, Li, Mg, Mn, Na, Sr, and Zn.

2. The positive electrode material of claim 1, wherein said encapsulant layer is formed from at least one component chosen from the group consisting of cobalt hydroxide, cobalt oxyhydroxide, manganese hydroxide, and a manganese oxide.

3. The positive electrode material of claim 2, wherein said encapsulant layer of is formed upon said particles of positive electrode material by precipitation from a salt solution.

4. The positive electrode material of claim 3, wherein said salt solution is a cobalt sulfate solution.

5. An electrochemical storage cell comprising:

at least one positive electrode;

at least one negative electrode; and electrolyte;

where said at least one positive electrode is a positive electrode formed from a paste of particles of a nickel hydroxide positive electrode material having a precursor coating of a substantially continuous, uniform encapsulant layer preciptated on said particles prior to preparation of active material paste, said encapsulant layer formed from a material that upon oxidation during processing or during charging increases resistance to corrosion products, increases the conductivity of said particles, and does not revert to its precharge form upon subsequent discharge;

where said nickel hydroxide additionally includes at least three compositional modifiers chosen from the group consisting of Al, Bi, Co, Cr, Cu, Fe, In, La, Mn, Ru, Sb, Sn, Ti, and Zn and at least one chemical modifier chosen from the group consisting of Al, Ba, Ca, Co, Cr, Cu, F, Fe, K, Li, Mg, Mn, Na, Sr, and Zn.

6. The electrochemical storage cell of claim 5, wherein said at least one electrochemically active hydroxide includes at least nickel hydroxide.

7. The electrochemical storage cell of claim 5, wherein said encapsulant layer is formed from at least one component chosen from the group consisting of cobalt hydroxide, cobalt oxyhydroxide, manganese hydroxide, and a manganese oxide.

8. The electrochemical storage cell of claim 7, wherein said encapsulant layer is formed by precipitation from a salt solution.

9. The electrochemical storage cell of claim 8, wherein said salt solution is a cobalt sulfate solution.

10. A method of making a positive electrode material for the formation of a paste for fabricating positive electrodes for use in an electrochemical cell, comprising the steps of forming particles of a nickel hydroxide positive electrode material;

precipitating a precursor coating of a substantially continuous, uniform encapsulant layer on said particles prior to preparation of active material paste, said encapsulant layer formed from a material that upon charging increases resistance to corrosion products and increases the conductivity of said particles, and does not revert to its precharge form upon subsequent discharge;

where said nickel hydroxide additionally includes at least three compositional modifiers chosen from the group consisting of Al, Bi, Co, Cr, Cu, Fe, In, La, Mn, Ru, Sb, Sn, Ti, and Zn and at least one chemical modifier chosen from the group consisting of Al, Ba, Ca, Co, Cr, Cu, F, Fe, K, Li, Mg, Mn, Na, Sr, and Zn.

11. The method of claim 10, wherein said encapsulant layer is formed from at least one component chosen from the group consisting of cobalt hydroxide, cobalt oxyhydroxide, manganese hydroxide, and a manganese oxide.

12. The method of claim 11, wherein said precipitation of said encapsulant occurs from a salt solution and further comprises the step of:

converting said encapsulating layer from a hydroxide to an oxyhydroxide using air oxidation.

13. The method of claim 12, wherein said salt solution is a cobalt sulfate solution.

14. A nickel metal hydride battery exhibiting an insignificant increase in internal pressure during cycling and a cycle life $\geq 500$ cycles, said nickel metal hydride battery comprising:

a pasted positive electrode formed from particles of nickel hydroxide positive electrode material; and a precursor coating of a substantially continuous, uniform encapsulant layer precipitated on said particles prior to preparation of active material paste, said encapsulant layer formed from a material that upon oxidation during processing or during charging increases resistance to corrosion products, increases the conductivity of said particles, and does not revert to its precharge form upon subsequent discharge;

where said nickel hydroxide additionally includes at least three compositional modifiers chosen from the group consisting of Al, Bi, Co, Cr, Cu, Fe, In, La, Mn, Ru, Sb, Sn, Ti, and Zn and at least one chemical modifier chosen from the group consisting of Al, Ba, Ca, Co, Cr, Cu, F, Fe, K, Li, Mg, Mn, Na, Sr, and Zn.

* * * * *